June 27, 1961 R. W. HYDE 2,990,269
REFINING OF ORES WITH HYDROCARBON GASES
Filed March 17, 1959 3 Sheets-Sheet 1

INVENTOR
RICHARD W. HYDE
BY
HIS ATTORNEYS

INVENTOR
RICHARD W. HYDE

HIS ATTORNEYS

United States Patent Office 2,990,269
Patented June 27, 1961

2,990,269
REFINING OF ORES WITH HYDROCARBON GASES
Richard W. Hyde, Lexington, Mass., assignor to Arthur D. Little, Inc., Cambridge, Mass., a corporation of Massachusetts
Filed Mar. 17, 1959, Ser. No. 799,972
12 Claims. (Cl. 75—26)

The present invention relates to the reduction of metallic ores and it relates particularly to the direct reduction of iron by means of hydrocarbon gases in a fluidized bed system.

In the reduction of iron ore, the controlling reaction is the conversion of FeO to iron. The reduction of FeO employing pure hydrogen is endothermic while the reduction of FeO with carbon monoxide is exothermic. Inasmuch as hydrogen and carbon monoxide can be used effectively as reducing agents, a mixture of these gases can be used to balance the endothermic-exothermic nature of the FeO reduction reaction. When the reduction of iron ore is conducted with a gas consisting essentially of carbon monoxide, hydrogen, and nitrogen in the ratios theoretically derived from the partial oxidation of pure methane with air, the overall thermodynamics of such a process are well balanced if the various reactants; i.e., ore, reducing gas, and air, are preheated to maximum practical temperatures. In supplying the heat required by these reactions to maintain temperatures of this high level in the reduction, both the natural gas and the ore must be heated to prohibitively high temperatures, particularly the natural gas which tends to crack at temperatures about 650° C. to 660° C. If the necessary heat is supplied from an external source through the walls of the reduction zone, temperature gradients become undesirably high and agglomeration and subsequent loss of fluidization of the ore or partially reduced ore result.

Natural gas and higher hydrocarbons, of course, can be completely preformed into carbon monoxide and hydrogen (so-called synthesis gas) but the existing processes for carrying out this preforming step are elaborate, requiring catalysts or thermal reformation at very high temperatures and long residence time to convert the methane to carbon monoxide and hydrogen with essentially no free methane, carbon dioxide, or water vapor in the resulting gas.

It also has been proposed to introduce separately the hydrocarbon gas and a combustion supporting gas, such as air, directly into the fluidized iron reduction zone in the proportions such that the hydrocarbon would eventually be converted to carbon monoxide and hydrogen. This approach involves carrying out the partial oxidation of methane and the reduction of iron simultaneously in the fluidized bed.

Such an operation is impractical for the reason that the direct introduction of a combustion supporting gas directly into a fluid bed system consisting of a highly reduced iron generates excessive localized temperatures due largely to the instantaneous oxidation of a portion of the iron. Although heat transfer in a fluid bed system is extremely rapid, it is not adequate to overcome the localized intense heat generated by the oxidation of iron, and as a result sintering occurs in the bed with a subsequent loss of fluidization.

Thus, in summary, while hydrocarbon gas can be preformed, it must be accomplished by means of a catalyst, separate gas generating apparatus and rather inefficient introduction of the required preheat. Non-catalytic reforming requires excessive temperatures to attain reasonable reforming rates or excessive residence time to complete the reforming reactions and produce reducing gas at temperatures which can be introduced directly into a fluidized reducing system without causing agglomeration. Prior proposals for direct addition of natural gas and a combustion supporting gas to the fluidized reducing reactor for simultaneous preforming and reduction are unworkable.

The present invention relates to a process and to apparatus whereby reduction of iron ores or oxides can be accomplished by means of direct reduction with hydrocarbon gas, such as methane or natural gas, without the attendant difficulties which characterize the prior efforts pointed out above.

More particularly, the present invention comprises partially oxidizing a preheated hydrocarbon gas with preheated air in a combustion chamber to an extent short of complete conversion of the hydrocarbon to carbon monoxide and hydrogen, and allowing the resulting gas mixture containing unreacted hydrocarbon to enter a fluidized iron reducing bed containing metallic iron which serves to catalyze the reaction and preforms the gases into a suitable reducing gas mixture capable of reducing iron oxides to iron at usable temperatures.

The combination of partial thermal reforming of natural gas in a preforming chamber followed by the final reforming by catalytic decomposition of methane in the presence of reduced iron, and reaction of carbon dioxide, water vapor, and ferrous oxide in the bed with the carbon resulting from decomposition of the hydrocarbon is the simplest, most direct method of applying both reducing gases and thermal energy at the proper temperature levels for gaseous reduction of iron ore.

In accordance with the invention, natural gas or other hydrocarbons is partially preformed in a combustion chamber to the degree that the temperature of resulting gas is not over 1150° C. The preformed gas which includes hydrogen and carbon monoxide, some unreacted methane or other hydrocarbon and some carbon dioxide and water vapor enters the fluidized reducing bed containing iron at a temperature level sufficient to promote rapid decomposition and final reforming of the gaseous reactants to produce a reducing gas equivalent to a mixture composed essentially of hydrogen and carbon monoxide while simultaneously carrying out on a continuous basis the reduction of ferrous oxide (FeO) to iron (Fe).

The optimum method of operation involves the use of a counterflow fluidized bed system consisting of several fluidized bed stages in which the preheated ore is introduced into the top preheating and prereduction stage and overflowed directly and from dust separators between stages to successive reducing stages as will be described in detail hereafter. Thus, the material entering the bottom stage will be in the form of FeO with some metallic iron. The final reduction to iron is largely accomplished within the bottom or final stage where the O/Fe ratio will be low so that both final reformation by decomposition of methane and reduction of the ferrous oxide can take place simultaneously. The feed rate to the bottom stage and, therefore, the feed rate to the entire system must be controlled so that there is a substantial fraction, i.e., 70% or more, of the iron present in the metallic form in the final stage in order to promote the rapid decomposition of the methane.

Carbon deposition is largely prevented by reaction with carbon dioxide and water vapor unless the degree of metallization, that is, ratio of iron in the metallic form to total iron present, is very high, approaching 100% in this bottom stage. If reduction is carried to completion, that is, 100% reduction of the oxide to iron, some carbon deposition could occur for the reason that the amount of $CO_2$ and water vapor in the incoming gas will be so low that rapid removal of carbon cannot be accomplished by the reaction of these gases with carbon. If carbon deposition is to be prevented, the rate of feed of iron in the oxide form must be great enough to prevent extremely high degrees of metallization in the final fluidized bed stage.

It has been found that the ideal heat transfer characteristics and mixing speed and the perfect uniformity of solids composition, gas distribution, and all other conditions throughout a fluidized mass of finely-divided iron and iron oxide promote rapid final reformation of the hydrocarbons with carbon dioxide and water vapor via the catalytic decomposition of methane on iron. The ratio of $CO_2/CO$ in the final iron reduction stage is maintained in the range of 50% to 90% of the equilibrium ratio for the reduction of ferrous oxide to iron in the presence of carbon monoxide and carbon dioxide at the temperature employed in this bottom stage for final FeO to Fe reduction. Similarly, the ratio of $H_2O$ to $H_2$ leaving the final stage is maintained close to, or at the equilibrium ratio for the reduction of FeO to iron in the presence of $H_2O$ and $H_2$ at the temperatures applied in this bottom stage.

The practical temperature range of this operation at the bottom stage is 750° C. to 1100° C. which permits both satisfactory operating rates of reforming, reduction and fluidization.

For a better understanding of the present invention, reference may be had to the accompanying drawings in which.

Figure 2:
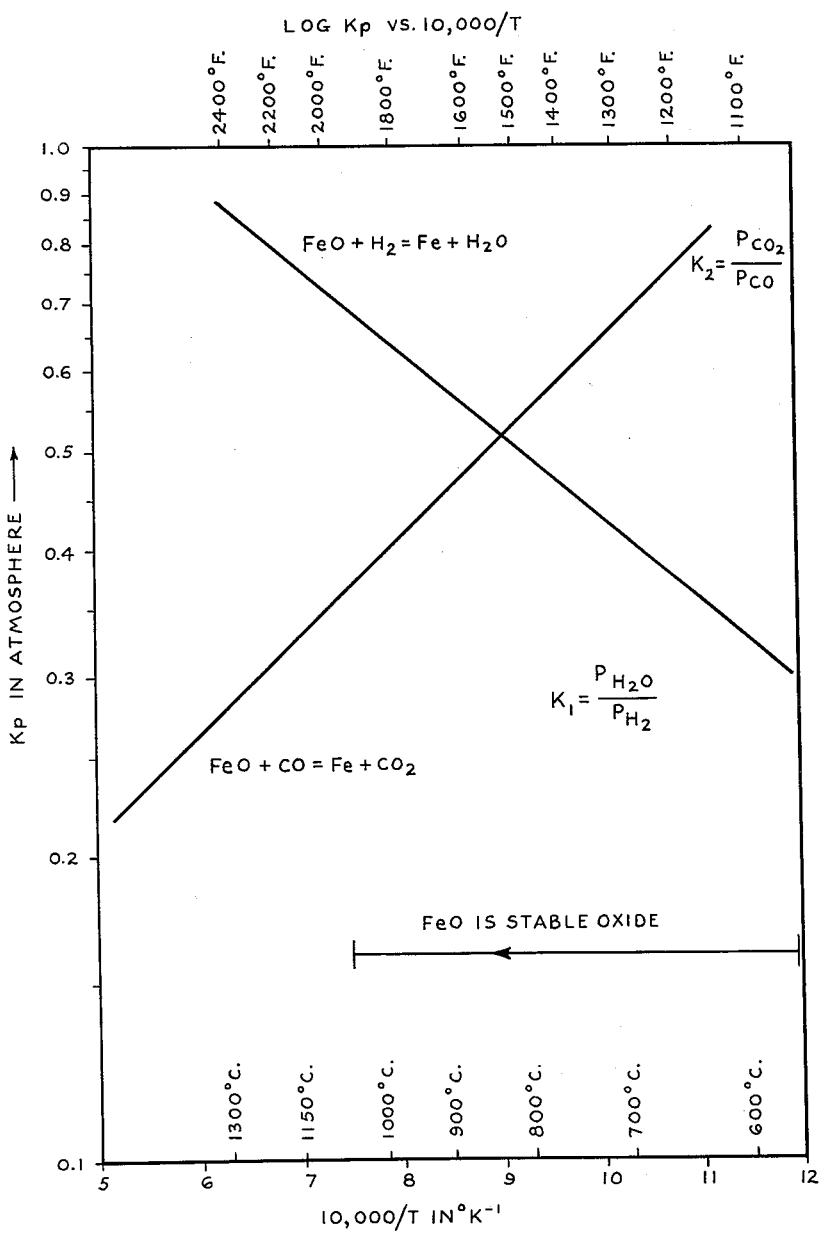
FIGURE 2 is a graph illustrating the relation of the $CO_2/CO$ ratio and the $H_2O/H_2$ ratio to the FeO/Fe equilibrium.

Using methane as an example of a hydrocarbon, air and $CH_4$ preheated to about 875° C. and about 535° C., respectively, are introduced into a combustion chamber in proper proportions to provide ½ mol of oxygen per mol of methane, which is equivalent to combustion of methane with 25% of theoretical air. This method of measure, i.e., percent theoretical air, is based upon 100% theoretical air being equivalent to combustion of methane completely to water vapor and carbon dioxide. The reaction must proceed at least to the extent that $CO_2/CO$ ratio and the $H_2O/H_2$ ratio fall below the equilibrium lines for the FeO reduction, as shown in FIGURE 2, in order to prevent net reoxidation of iron in the fluidized bed. For example, referring to FIGURE 2, at a reducing bed temperature of 900° C. the $CO_2/CO$ ratio in the gas entering must be at least below 0.45 and the $H_2O/H_2$ ratio at least below 0.85.

Figure 3:
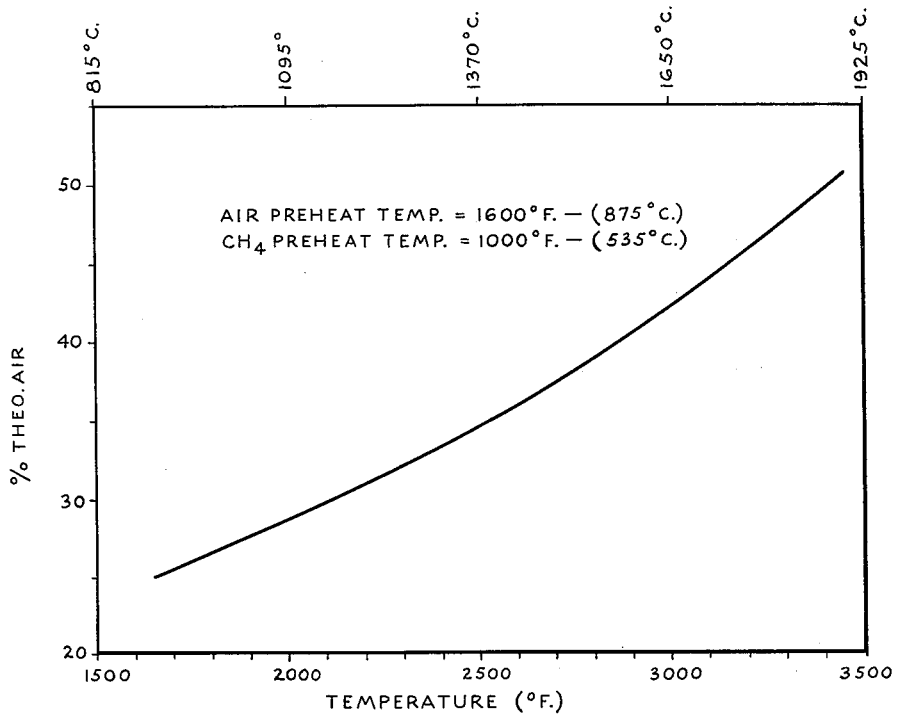
FIGURE 3 is a graph representing the adiabatic flame temperature from combustion of methane with varying amounts of air.

This amounts to combustion of methane with approximately 50% theoretical air. Actually, however, the temperature of the gas entering the fluidized reducing bed imposes an even greater limitation on the degree of partial combustion which must be accomplished in the combustion chamber. FIGURE 3 presents the relation between adiabatic flame temperature from combustion of methane heated to 535° C. with varying percentages of air heated to 875° C. At 50% theoretical air, the gas temperature would approach 1930° C. which is considerably above the temperature at which the gas can be introduced directly into the bed without causing sintering of the reduced iron particles.

I have found that gas having temperatures up to about 1150° C. can be directly introduced into the fluidized reducing bed without sintering the reduced iron particles. Therefore, as illustrated in FIGURE 3, the partial combustion of methane should not exceed about the equivalent of 28% or 29% of theoretical air if gas temperatures of 2100° F. (1150° C.) are not to be exceeded. I have found that this is also consistent with rate of the reformation reactions which are largely controlled by temperature and mixing. From the disclosure of FIGURE 3, it will also be understood that as the percentage of theoretical air drops, the adiabatic flame temperatures drop to 1660° F. (905° C.) at 25% theoretical air which is the ultimate mixture employed in the reduction process. This figure can also be considered as indicating the extent to which the endothermic reformation reaction affects the temperature of the resulting gas. Inasmuch as the rate controlling reformation reactions are temperature sensitive, there is a relation between operating temperature and residence time. Non-catalytic reformation is largely limited to the temperature range of 1150° C. to 1540° C. because below 1150° C. rates are too slow and long residence time and large preforming chamber volumes are required. It will be apparent that reforming of the last portion of the methane equivalent to approaching the burning down to 25% theoretical air is most difficult. The temperature, as well as the partial pressure of reactants adversely affects the reaction rate. Thus, it is advantageous to design the reforming chamber with sufficient hold-up to carry the reaction to the equivalent of combustion with 28% to 30% theoretical air and allowing the remaining unreacted methane, together with other gaseous products of the reaction to enter the bottom of final iron reducing fluidized bed.

Partial combustion of methane or other hydrocarbon gas can be conducted in several different ways. The total methane to be introduced into the reducing chambers can be burned in the combustion chamber with the theoretical amount of air required for carrying out the total reactions:

(1) 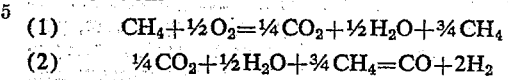

(2) 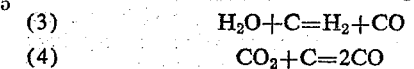

and carrying the preforming to a state equivalent to 28% to 30% theoretical air. The partially preformed gas containing the unreacted methane enters the bed containing metallic iron for final reforming. Reforming is accomplished by the catalytic cracking of methane on the reduced metallic iron and the gasification of the resulting carbon is accomplished according to the reactions:

(3) $H_2O + C = H_2 + CO$ (4) $CO_2 + C = 2CO$

Actually, unless mixing in the precombustion chamber is precise, some of the methane will be cracked thermally to carbon and hydrogen with a solid gasified carbon contained in the gas passing into the bed. Carbon formed in this way does not tend to plug the orifice openings in the bed supporting hearth or deck but enters the bed and reacts with ferrous oxide, water vapor, and carbon dioxide so that carbon formation in the preforming combustion chamber does not adversely affect the operation of the system.

Another method of operation is feasible. For example, 12½% methane is unreacted with air by combustion to the equivalent of 33% theoretical air. In this process (12½%) methane may be added separately and directly to the bed containing metallic iron in order to minimize carbon formation in the combustion chamber and avoid any tendency for carbon to build up in the combustion chamber.

When, in the course of reduction of $Fe_2O_3$ with methane, the ore reaches the FeO stage (ratio of O/Fe=1.0) the rate of cracking or decomposition of methane falls to an extremely low level but is far higher on both sides of this oxygen to iron ratio, particularly on the iron side; i.e., when the atomic ratio of oxygen to iron is less than 1.0, preferably below 0.2 to 0.3, which is equivalent to 80 or 75% metallization. This relationship is shown graphically in FIGURE 4. It is this fact that makes it possible to accomplish the final degree of preforming in a reducing fluidized bed, providing the bed is operated in the high metallization range where methane cracking will take place at a rapid rate. Thus, the final degree of reformation takes place in the bed by cracking the remaining methane to hydrogen and carbon and allowing the carbon dioxide and water vapor entering the gas or generated through reduction of FeO to react with the deposited carbon to form carbon monoxide and hydrogen according to the reactions 3 and 4 above.

The gas produced by partial combustion of methane or other hydrocarbon gas entering the fluidized bed reactor has approximately the following composition (on the basis of assumed preforming to an equivalent of precombustion with, for example, 30% theoretical air). $N_2=41.5\%$, $CO=18.1\%$, $CO_2=0.75\%$, $H_2=34.0\%$, $H_2O=3.0\%$ and $CH_4=2.7\%$.

This gas would be reformed in the bed generally in accordance with reaction 2, provided the O/Fe ratio is sufficiently low to promote rapid decomposition of methane. It has been found that the fluidized bed provides almost ideal heat transfer characteristics, mixing speed and the perfect uniformity of solids composition, gas distribution, and all other conditions for promoting rapid final reformation of the methane or other hydrocarbons with carbon dioxide and water vapor. Actually, it is this mixing plus the high oxygen content both of which are obtained in the bed itself that makes possible the final rapid reformation of methane to carbon and hydrogen. The catalytic effect of the iron also is an important factor in carrying out this reaction and the tremendous mixing obtained in the bed helps to complete the water vapor and carbon dioxide reactions with the carbon deposited in the bed as a result of the methane cracking.

The process is applicable to oxidic iron ores having particle sizes ranging from less than 20 microns up to ⅛ inch. Mixtures of particles of widely varying size can be reduced successfully by the gases flowing upward through a plurality of fluidized reaction stages at linear velocities of between .3 and 5 feet per second. Operations of this type may be successfully carried out in conventional refractory-lined, heat-insulated equipment. Assuming that the reactants or natural gas and air are preheated to the maximum temperature levels (natural gas—535° C. to 660° C.; air—875° C. to 1000° C.) and the ore is partially reduced in the top preheating and prereduction stage, about 14,000 to 15,000 cu. ft. of natural gas will be required per ton of hematite ore reduced to 85% to 90% metallization. The off-gases leaving the top stage of the reduction in the preferred embodiment of this process can be used for preheating the reactants and prereducing the ore in the top fluidized bed stage to minimize heat requirements in the subsequent reducer and this invention contemplates the use of these off-gases for these and other purposes.

Figure 1:
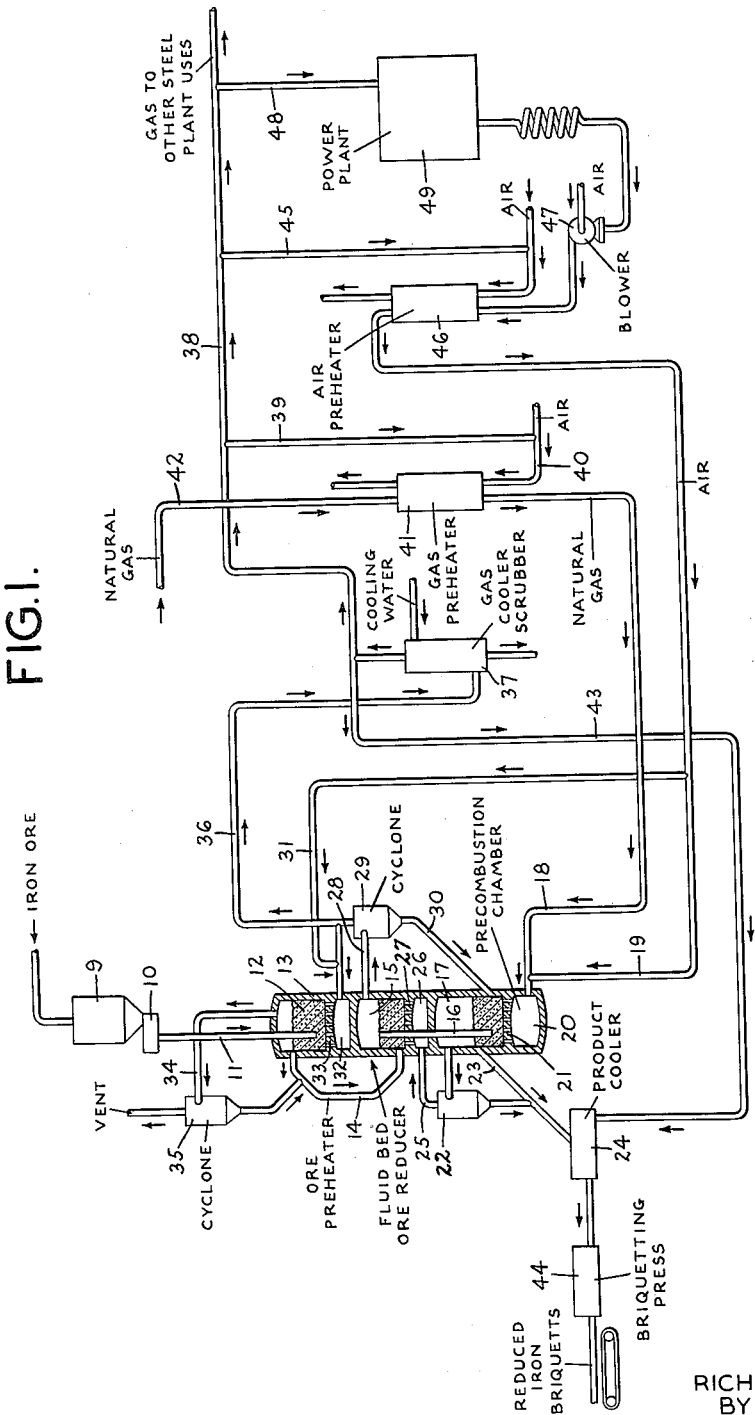
FIGURE 1 is a schematic illustration of a typical system for practicing the invention.
Figure 4:
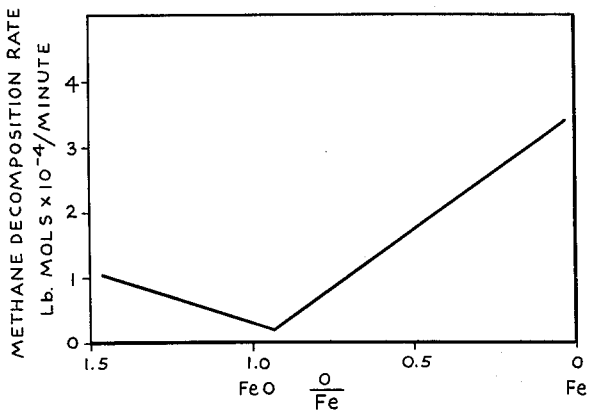
FIGURE 4 is a graph illustrating the decomposition rates of methane in the presence of metallic iron and ferrous oxide.

FIGURE 1 illustrates a typical system for practicing the invention. The system will be described with reference to its use in the reduction of iron ores, although it is not limited to such use. As shown in FIGURE 4, the system includes a hopper 9 for receiving iron ore in a finely-divided state, that is, having a particle size between about 50 microns and ¼ of an inch in diameter. The ore particles are discharged by means of a feeder 10 and a feed line 11 into a preheating and prereducing chamber 12 in the upper end of a reducing column 13. A bed of ore formed in the chamber 12 is maintained in a fluidized state in a manner described hereinafter and is heated and partially reduced in the chamber and discharged by means of a downcomer 14 into a reducing chamber 15 where it is subjected to further fluidization and reduction by means of the reducing gases. The partially reduced product is discharged from the reducing chamber 15 by overflow through a downcomer 16 into a final reducing chamber 17. While a single preheating and prereducing stage 12 and two reducing stages 15 and 17 are illustrated in FIGURE 1, it will be understood that more than two reducing stages 15 and 17 may be provided, if desired.

In order to reduce the ore and maintain proper reducing conditions in the reducing and prereducing chambers, preheated hydrocarbon gas, such as, for example, methane, is supplied by means of the pipe line 18 and mixed with heated air supplied by means of pipe line 19 for combustion in a precombustion chamber 20 in the bottom of the column 13. As indicated above, the ratio of air to gas and the temperatures of the gas and air are regulated so that the natural gas is partially reformed into hydrogen, carbon monoxide and contains methane, nitrogen and moisture. The mixture of gases flows through the porous bottom or hearth 21 of the final reduction chamber 17 into intimate contact with the iron oxide and metallic iron particles therein fluidizing the product and also by catalytic action of the metallic iron on the methane and the oxidation reduction reaction taking place in the bed completing the reformation of the gas into hydrogen and carbon monoxide. In order to avoid agglomerating the reduced or partially reduced product in the reaction chamber 17, the air introduced into the combustion chamber is preheated to between about 875° C. and 1000° C. while the natural gas is heated to a temperature below cracking temperature, that is, between about 535° C. and 660° C. The amount of air supplied is sufficient to produce ½ mol of oxygen per mol of methane so that the temperature of the gas entering the reaction chamber 17 is between about 750° C. and 1100° C. Gas is supplied at a rate in the range of about 12,000 to 15,000 cubic feet of natural gas per ton of iron produced and a velocity between about 1½ and 5 feet per second.

The gas which is somewhat reduced in temperature is discharged from the reaction chamber 17 into a cyclone separator 22 or its equivalent which separates the fines carried over by the gases and discharges them into the downcomer 23 through which the material in the chamber 17 is discharged to a product cooler 24. Clean gas from the separator 22 is discharged through a pipe 25 into a chamber 26 below the reaction chamber 15 for flow upwardly through the porous hearth or bottom 27 of the reaction chamber 15 to fluidize and further reduce the partially reduced oxide therein. Gas is discharged from the chamber 15 by means of a pipe 28 into a cyclone separator 29 which removes the fines and dischcarges them downwardly through a pipe 30 into the bed in the chamber 17. Part of the clean gas from the separator 29 is mixed with air supplied by the pipe 31 and burned in a combustion chamber 32 below the porous floor bottom or hearth 33 of the preheating and precombustion chamber 12. In this way, the temperature of the gas entering the prereduction chamber 12 is raised into the range of about 750° C. to 1100° C., a temperature high enough to preheat the raw ore and to rapidly convert the hematite in the ore to magnetite and at least a part of the magnetite to ferrous oxide. By preheating and prereducing to a substantial degree in the preheating stage 12, the heat requirements in the reducing stages 15 and 17 are diminished substantially so that the operating efficiency of the system as a whole is enhanced.

Spent gases from the prereducing and preheating chamber 12 are discharged by means of a pipe 34 into a cyclone separator 35 where the fines are separated and delivered into the reaction chamber 15 for further treatment therein.

The velocity of the gases flowing through the beds in the chambers 12, 15 and 17 should be sufficient to maintain the desired fluidization and under optimum conditions should be such as to remove the fines when they have attained about the same degree of reduction as the larger particles which are being discharged through the downcomers into the succeeding reducing zone. To that end, it has been found that a gas velocity between about 1½ feet and 5 feet per second, based on an empty chamber, is suitable and under most conditions, a velocity of about 3 feet per second is optimum.

The spent gases can be used for many purposes to improve the efficiency or economy of the system. Thus, the off gas from the separator 29 may be discharged through a pipe line 36 to a conventional gas cooler and scrubber 37 and then is distributed through the pipe line 38. Part of the spent gas may be discharged through a line 39 and mixed with air supplied by pipe line 40 for combustion in a conventional gas preheater 41 wherein the natural gas supplied by the pipe line 42 is heated to the desired temperature for combustion in the combustion chamber 20. Part of the cooled spent gas may be supplied by means of a pipe line 43 to the product cooler 24 to enable the cooling of the product in a non-oxidizing atmosphere prior to further treatment of the product such as, for example, the production of briquettes in a briquetting press 44 or the like. Spent gases may be supplied by means of a pipe line 45 to the air preheater 46 where it is burned to heat the air supplied by means of the blower 47 to the combustion chambers 20 and 32. Another part of the gas may be supplied by means of the pipe line 48 to a power plant 49 which supplies power for operating the blower 47 and for other purposes.

In the usual operations according to the present invention the product discharged to the product cooler consists of 70% to 95% of iron in metallic state and 5% to 30% of iron in the form of iron oxide. This product can be briquetted and further treated to completely convert it to metallic iron.

It will be understood that the temperature of the combustion products produced by burning the natural gas with a deficiency of oxygen can be regulated so that the temperature thereof is within the range in which reduction can be accomplished in the chamber 17 without sticking or agglomeration of the product. Due to cooling of the gas by the reactions in reducing chamber 17, its temperature is satisfactory for prompt reaction with the partially reduced ore in the reaction chamber 15 and low enough to avoid sticking or agglomeration of the particles. By burning part of the gas entering the preheating and prereducing chamber 12, the gas temperature is increased enough to preheat the ore particles and to reduce them to a state such as to facilitate their after treatment in the reducing stages 15 and 17.

While the system described above is preferred, it will be understood that it is susceptible to considerable modification in its arrangement, in the number of reducing stages provided and in the use of the spent gases issuing from the reducing system. Accordingly, the examples of the method and the system given herein should be considered as illustrative and not as limiting the scope of the following claims.

I claim:

1. A process of reducing iron oxides to metallic iron comprising burning a hydrocarbon gas heated to a temperature less than its cracking temperature with heated air in an amount insufficient to raise the temperature of the combustion products substantially above 1150° C., passing the heated combustion products into a bed of finely divided iron oxide and finely divided metallic iron from below to fluidize said bed, said bed having an atomic oxygen to iron ratio of less than 1.0, said metallic iron serving as a catalyst to convert the combustion products to a reducing gas composed principally of hydrogen and carbon monoxide, and said reducing gas reducing said iron oxide in said bed at least partially to metallic iron.

2. A process of reducing iron oxides to metallic iron comprising burning a hydrocarbon gas preheated to a temperature between about 535° C. and 660° C. with heated air in an amount insufficient to raise the temperature of the combustion products substantially above 1150° C., passing the hot combustion products into a bed of finely divided iron oxide and finely divided metallic iron from below to fluidize said bed, said bed having an atomic oxygen to iron ratio such that said bed is about 75% to 80% metallized, said metallic iron serving as a catalyst to convert the combustion products as a reducing gas composed principally of hydrogen and carbon monoxide and said reducing gas reacting with said iron oxide to convert it at least partially to metallic iron.

3. A process of reducing iron oxides to metallic iron comprising burning a hydrocarbon gas heated to a temperature between about 535° C. and 660° C. with air heated to between about 875° C. and 1000° C. in an amount insufficient to produce combustion products having a temperature substantially in excess of 1150° C., passing the hot combustion products into a bed of iron oxide containing metallic iron from below to fluidize said bed, said bed having an atomic oxygen to iron ratio such that said bed is about 75% to 80% metallized, said metallic iron serving as a catalyst to convert the combustion products to a reducing gas composed principally of hydrogen and carbon monoxide and said reducing gas reacting with said iron oxide to convert it at least partially to metallic iron.

4. A process of reducing iron oxides to metallic iron comprising burning a hydrocarbon gas heated to a temperature between about 535° C. to 660° C. with between about 24% and 33% of the air theoretically required to convert said hydrocarbon to carbon dioxide and water, said air being in insufficient amount to raise the temperature of the combustion products substantially above 1150° C., introducing the combustion products from below into a bed of finely-divided iron oxide containing finely-divided metallic iron to fluidize the bed, said bed having an atomic oxygen to iron ratio such that said bed is about 75% to 80% metallized, said metallic iron serving as a catalyst to convert said combustion products into a reducing gas composed principally of hydrogen and carbon monoxide, and said reducing gas reacting with said iron oxide to convert it at least partially into metallic iron.

5. A process of reducing iron oxides to metallic iron comprising burning a hydrocarbon gas heated to a temperature less than its cracking temperature with heated air in an amount insufficient to raise the temperature of the combustion products substantially above 1150° C., passing the heated combustion products together with additional heated hydrocarbon gas into a bed of iron oxide containing metallic iron from below to fluidize said bed, said bed being about 75% to 80% metallized, said metallic iron serving as a catalyst to convert the combustion products to a reducing gas composed principally of hydrogen and carbon monoxide, and said reducing gas reducing said iron oxide in said bed at least partially to metallic iron.

6. A process of reducing iron oxides to metallic iron comprising burning a hydrocarbon gas heated to a temperature between about 535° C. and 660° C. with between about 24% and 33% of the air theoretically required to convert said hydrocarbon to carbon dioxide and water, introducing the combustion products from below into a bed of finely-divided iron oxide containing finely-divided metallic iron to fluidize the bed, said bed being about 75% to 80% metallized, said metallic iron serving as a catalyst to convert said combustion products into a reducing gas composed principally of hydrogen and carbon monoxide, and said reducing gas reacting with said iron oxide to convert it at least partially into metallic iron.

7. A process of reducing iron oxides to a highly metallized state comprising burning a hydrocarbon gas heated to a temperature below the cracking temperature thereof with heated air in an amount between about 24% and 33% of the amount theoretically required to convert the hydrocarbon to carbon dioxide and water thereby to partially reform said gas into hydrogen and carbon monoxide and heat it to a temperature not substantially exceeding 1150° C. and introducing the partially reformed gas into a bed of partially reduced iron oxide containing metallic iron to fluidize said bed and substantially complete the conversion of said gas to hydrogen and carbon monoxide and reduce at least a part of the iron oxide in said bed to iron said bed being about 75% to 80% metallized.

8. A process for preforming hydrocarbon gases comprising burning heated hydrocarbon gas with heated air, said air being supplied in an amount insufficient to convert said hydrocarbon completely to carbon dioxide and water and producing combustion products having a temperature not substantially in excess of 1150° C. and passing the hot combustion products from below into a bed containing iron oxide and metallic iron in a finely-divided state to fluidize the bed and bring the combustion products into intimate contact with said metallic iron to complete substantially the reforming of the hydrocarbon gas to a reducing gas composed principally of hydrogen and carbon monoxide said bed being about 75% to 80% metallized.

9. A process of reducing iron oxides comprising passing a reducing gas produced in accordance with the process set forth in claim 8 through a bed of finely-divided iron oxide from below to fluidize said bed and reduce said iron oxide at least partially to metallic iron.

10. The process set forth in claim 8 comprising introducing hydrocarbon gas into said bed with said hot combustion products.

11. The process set forth in claim 8 in which said hydrocarbon gas is preheated to a temperature not substantially exceeding 660° C. prior to burning and said air is preheated to between about 875° C. and 1000° C.

12. The process set forth in claim 11 in which air is supplied in an amount between about 24% and 33% of the amount theoretically required to convert said hydrocarbon completely to carbon dioxide and water.

References Cited in the file of this patent
UNITED STATES PATENTS 2,711,368     Lewis _____ June 21, 1960

OTHER REFERENCES

Iron and Steel Engineer, January 1958, pages 69–78. Published by the Association of Iron and Steel Engineers, Pittsburgh, Pa.